Dec. 23, 1941. L. F. GOODRICH 2,267,236
GLASS PRESSING APPARATUS
Filed Aug. 30, 1938 3 Sheets-Sheet 1

INVENTOR.
LEVI F. GOODRICH
BY Dorsey Coler Garner
ATTORNEYS

Dec. 23, 1941.   L. F. GOODRICH   2,267,236
GLASS PRESSING APPARATUS
Filed Aug. 30, 1938   3 Sheets-Sheet 2
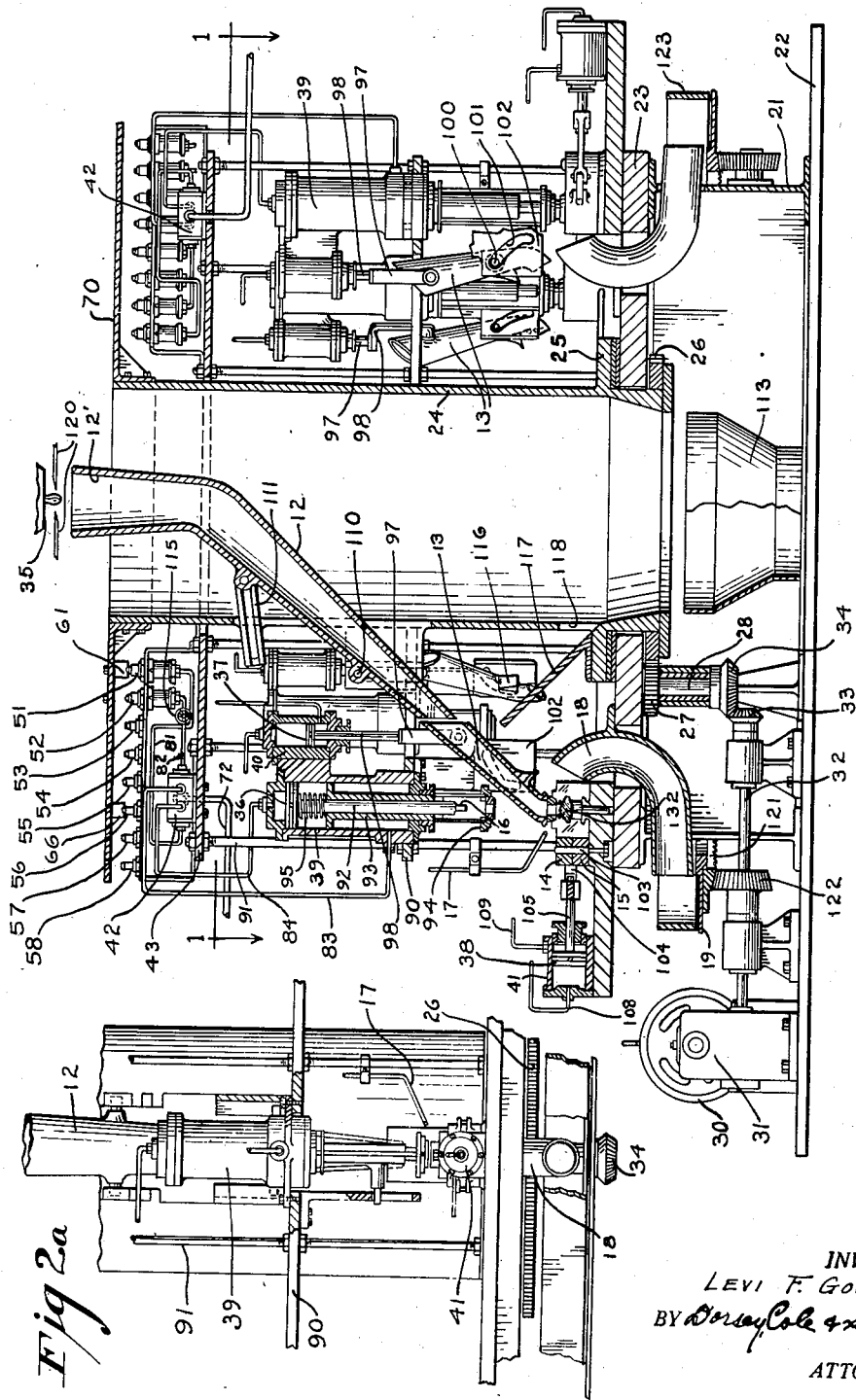
INVENTOR.
LEVI F. GOODRICH
BY Dorsey Cole & Garner
ATTORNEYS.

Dec. 23, 1941.　　　　L. F. GOODRICH　　　　2,267,236
GLASS PRESSING APPARATUS
Filed Aug. 30, 1938　　　　3 Sheets-Sheet 3

INVENTOR.
LEVI F. GOODRICH
BY Dorsey, Cole + Garner
ATTORNEYS.

Patented Dec. 23, 1941

2,267,236

UNITED STATES PATENT OFFICE 2,267,236

GLASS PRESSING APPARATUS

Levi F. Goodrich, Corning, N. Y., assignor to Corning Glass Works, Corning, N. Y., a corporation of New York Application August 30, 1938, Serial No. 227,551

5 Claims. (Cl. 49—5)

The present invention relates to glass working presses, and is particularly concerned with the provision of an improved form of press especially suitable for the quantity production of small glass articles.

The primary object of the invention is the rapid and automatic production of glass articles.

Another object is an improved method of delivering charges of glass to the respective molds of a glass working machine.

The invention embodies among its features means for severing a flowing stream of molten glass into mold charges, a plurality of pressing units arranged in an annular row about the axis of the flowing stream, means for receiving successive charges of molten glass and delivering them in succession to the pressing units, means for successively operating the pressing units immediately following the delivery of glass thereto, means for ejecting articles from the pressing units upon the completion of the pressing operation, means common to the units to receive such articles, means for enabling glass being fed to the press to pass directly to a cullet chute when desired, and means associated with the respective pressing units for deflecting charges of glass received thereat to the cullet chute instead of to the associated unit when desired.

A preferred form of the invention is shown in the accompanying drawings wherein:

Fig. 2 is a sectional elevation taken on line 2—2 of Fig. 1;

Fig. 2a is a view of the apparatus shown in Fig. 1a as seen when looking in the direction indicated by arrows 2a—2a;

Figure 1:
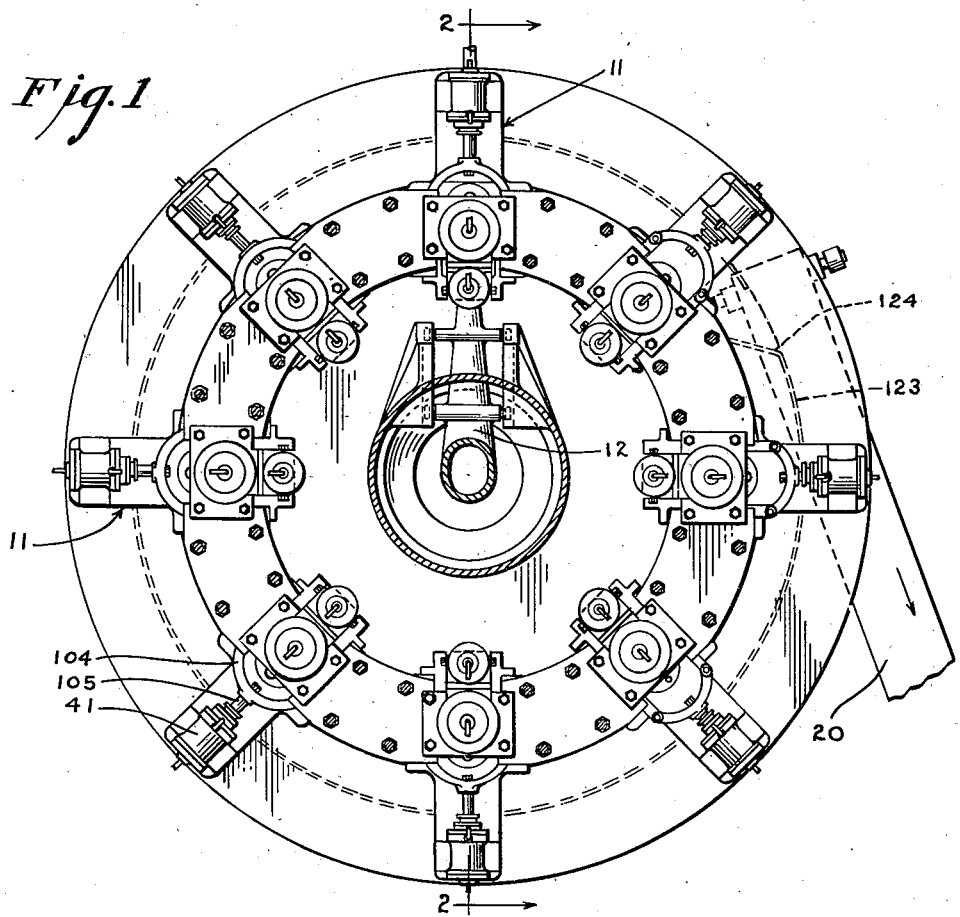
Fig. 1 is a sectional plan view of a glass pressing apparatus, employing eight pressing units, taken on line 1—1 of Fig. 2.

In brief, the glass working press shown is provided with eight pressing units, generally designated 11 (Fig. 1), arranged in an annular row, successively fed mold charges from a continuously rotating distributing member 12. As this member approaches a pressing unit, a charge guide member 13 (Fig. 2) individual thereto is brought into position to direct a mold charge issuing from the member as it passes a pressing station into the mold of the associated pressing unit which comprises mold halves 14 and 15. After the charge is delivered, the guide member moves clear of the path of the mold plunger 16 and such plunger effects the pressing operation. When the plunger is raised the mold halves open laterally and a blast of air from a tube 17 ejects the pressed article into a chute 18 which opens onto a rotating platform 19. This platform conducts the ware to a straight line conveyor 20 (Fig. 1).

More specifically, the structure illustrated includes a circular support 21 which rests on a main platform 22 and has mounted thereon a main supporting plate 23. A vertically disposed cylinder 24 has an external flange 25 near its lower end which serves as a thrust bearing rotatably supporting the cylinder on plate 23, and at a point immediately below this plate carries a ring gear 26 by means of which the cylinder is rotated by a pinion 27 on the upper end of a stub shaft 28. Rotation of shaft 28 is effected by a motor 30 through a gear reduction unit 31, a shaft 32 and bevel gears 33 and 34. The cylinder 24 carries the charge distributing member 12, which normally is in such position that its charge receiving end 12' remains in coaxial alignment with the bottom outlet 35 of a forehearth, whereas its lower end is successively carried into alignment with the charge guide funnels 13 of the pressing units.

Figure 5:
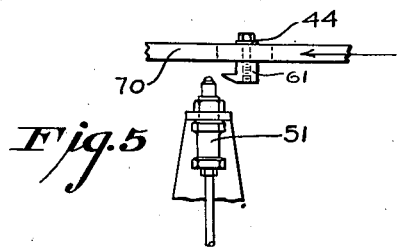
Fig. 5 is a detail illustrating one of the several pilot valves and a fragment of a rotating table carrying a pilot valve operating member.

In brief, the various functions of each pressing unit are performed by pneumatically actuated pistons 36—38 operating in cylinders 39—41 to whose opposite ends air is supplied at the appropriate times by control valves 42 individual to the respective cylinders and carried by a fixed plate 43. Each of these control valves is operated under the influence of a particular pair of bleeder valves of a group 51—58 (Figs. 2 and 6) individual to a pressing unit and operated at appropriate times by actuating members 61—68 each adjustably secured to the under side of a plate 70 by a cap screw 44 (Fig. 5). In order to avoid complication of the disclosure only those control valves 42, individual to the pressing control cylinders 39 of the two pressing units appearing in Fig. 2 have been shown.

Figure 3:
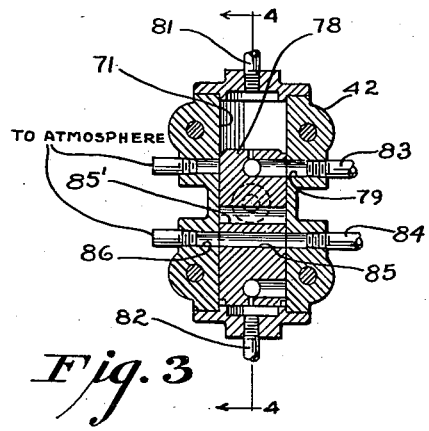
Fig. 3 is an enlarged sectional view of one of the several like control valves employed.
Figure 4:
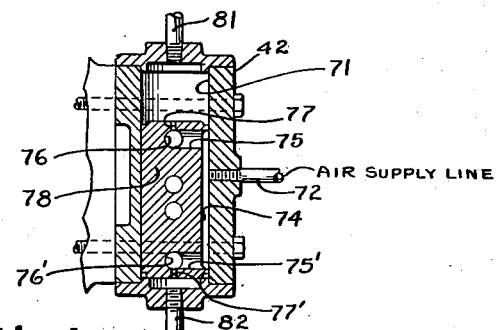
Fig. 4 is a sectional view taken on line 4—4 of Fig. 3.

Each control valve is composed of a cylinder 71 (Figs. 3 and 4), the opposite ends of which are in communication with bleeder valves such as valves 51—56 adapted when operated by an actuating member, such as 61, to release pressure from the end of the cylinder with which it is connected. Air is constantly supplied to the respective ends of the cylinder 71 from an air supply line 72 via passages 74—77, and via passages 74 and 75'—77', respectively, so that a balanced pressure exists at the cylinder ends so long as the connected bleeder valves remain closed and accordingly, the piston 78 remains in the position it has last moved. When, however, such balance of pressure is destroyed by the opening of one of the connected bleeder valves the piston shifts to the end of the cylinder which has been bled. For convenience of describing the operation of the control valves, it is assumed that the valve shown in Figs. 3 and 4 is the control valve 42 under the influence of bleeder valves 51 and 52 individual to the plunger control cylinder 39 shown in section in Fig. 2 and, accordingly, the tubes extending from the valve 42 in Figs. 3 and 4 have been designated to correspond with the designations given the tubes in Fig. 2 extending from valve 42 therein. With the piston 78 in the position shown, air supplied to the control valve cylinder 71, from line 72, is free to flow through passages 74, 75, 76, and a passage 79 (Fig. 3) to tube 83 extending to the bottom of cylinder 39 and accordingly the piston 36 therein is held in the position shown. The top end of cylinder 39 is at this time connected to atmosphere via a path incuding tube 84 and aligned control valve passages 85 and 86. As soon as member 61, carried by plate 70, engages and actuates bleeder valve 51, it bleeds air from line 81 to effect the movement of piston 78 of valve 42 to the upper end of its cylinder. When in such position, the upper end of cylinder 39 of the pressing plunger is fed air from line 72 via passages 74, 75', 76', 85 (Fig. 3), and tube 84. At this time, the lower end of the cylinder 39 is connected to atmosphere via tube 83 and aligned passages 79 and 85' in the control valve.

The cylinders 39 and 40 of the pressing plunger and mold charge guide assemblies of each pressing unit are supported on an annular plate 90 carried by studs 91. A piston actuated shaft 92 depends from cylinder 36 and has its lower end shaped into the pressing plunger 16 hereinbefore referred to. Immediately surrounding shaft 92 is a sleeve 93 from which a suitable mold ring 94 is suspended. The shaft 92 is normally held in its uppermost position with respect to sleeve 93 by a spring 95.

The charge guide funnel 13 of each pressing unit must obviously be moved clear of the path of movement of the associated plunger assembly after having directed a mold charge into the mold. This movement is taken care of by pivotally suspending such guide funnel on a bracket 97 carried by a shaft 98 raised and lowered by the associated piston 37. The movement of the guide funnel 13 is guided into and out of feeding relation with respect to the mold assembly by a pin 100 operating in a suitably shaped slot 101 in a fixed plate 102. As will be clear from the previous description, air for operating piston 37 is supplied to cylinder 40 at the proper times by a control valve (not shown) similar to valve 42, under the influence of bleeder valves 55 and 56.

The mold halves 14 and 15 of each pressing unit are mounted to pivot about a pin 103. Such movement is effected by a yoke 104 carried by a shaft 105 actuated by piston 38. As will be clear from the foregoing description, actuation of the piston 38 is under the influence of a control valve (not shown) such as the control valve 42 already described, connected with tubes 108 and 109 and under the influence of bleeder valves 54 and 55.

Figure 1A:
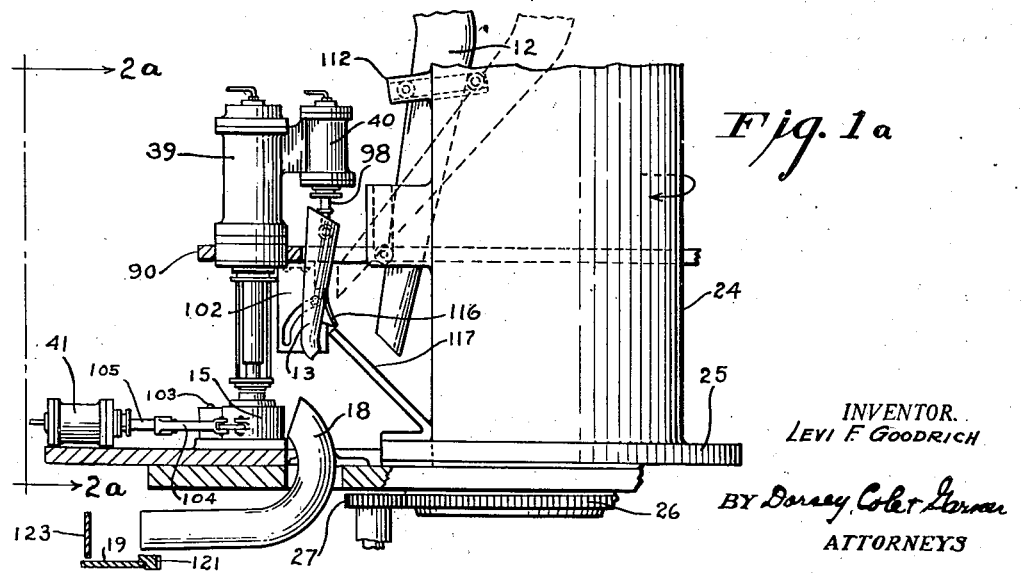
Fig. 1a is a side elevation on an enlarged scale of a fragment of the apparatus of Fig. 1, showing the charge distributing funnel thereof in its alternative position.

Under certain circumstances, for example when starting operations, it may be desirable to prevent glass issuing from forehearth outlet 35 from reaching the pressing units. The charge distributing member 12 has accordingly been pivotally secured to cylinder 24 at 110 and is held in charge receiving position near its top end by an adjustable link 111 clamped to a lug 112 (Fig. 1a) carried by cylinder 24. By loosening the clamping bolt of link 111, the distributing member can be shifted to the position illustrated in Fig. 1a so that any glass issuing from the forehearth outlet will thereafter pass directly into a cullet chute 113.

Under certain circumstances, it may be desirable to operate the press with one or more of the pressing units out of service. This may be accomplished by closing valves installed in the air lines extending between the bleeder valves and their associated control valves, thereby preventing movement of the associated guide funnel into feeding relation to its mold cavity, the unnecessary opening and closing movements of the mold, or the lowering of the plunger. One such valve, 115 is illustrated in line 82 extending between control and bleeder valves 42 and 52, respectively. When such valves 115 are closed, a charge of glass issuing from distributing member 12 at the inactive position encounters a deflector plate 116, on the disabled guide funnel, which deflects the charge onto a deflecting plate 117 (see Fig. 1a) so that the charge passes through an aperture 118 in the wall of the cylinder 24 and on into cullet chute 113.

Figure 6:
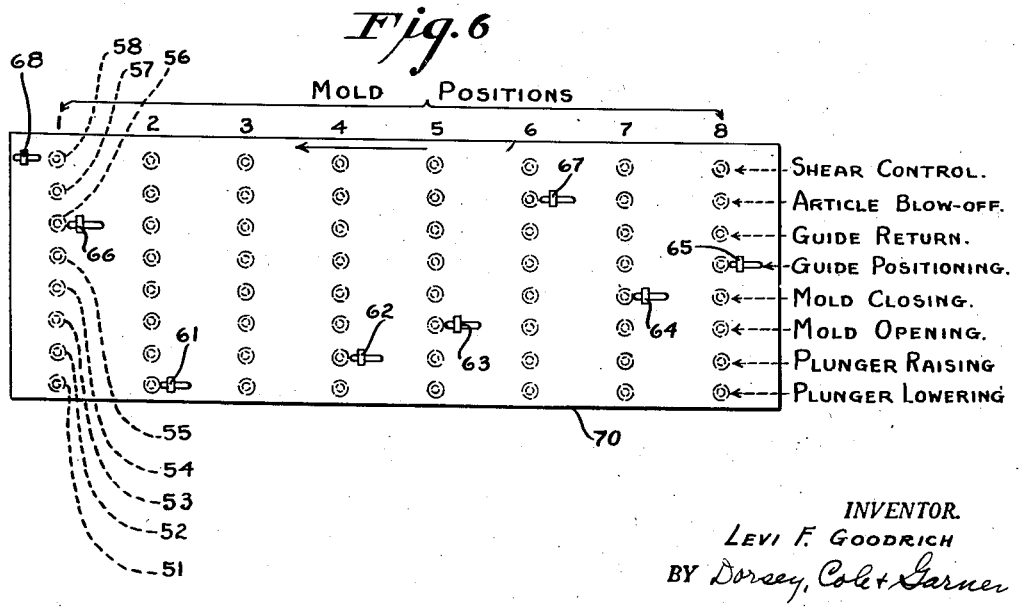
Fig. 6 is a straight line diagram illustrating the position of the several pilot valves relative to their operating members.

The mechanism for operating a pair of shear blades 120, arranged to sever charges of glass from the stream issuing from the forehearth outlet, has not been shown, but may be any of several known forms. The timing of their operation, however, must be such as to occur just as the distributing member 12 is coming into register with a charge guide funnel 13. To accomplish this, the operation of the shear mechanism is placed under control of a bleeder valve 58 at each mold position under control of an actuating member 68 (Fig. 6).

As previously mentioned, discharge and delivery of pressed articles from the respective mold units into chute 18 is by means of air directed toward the article by a tube 17 (Figs. 2 and 2a). These tubes are connected to the exhaust outlets of bleeder valves 57 successively operated by a member 67 (Fig. 6). The moving platform 19 to which the finished articles are delivered is supported by a ring gear 121 driven by a pinion 122 on drive shaft 32. A split retaining ring 123 (Fig. 1) surrounds the platform and has one end, 124, thereof bent to shunt the finished articles from this platform to the straight line conveyor 20.

*Operation*

The cycle of events occurring at any active pressing position can best be explained by reference to Fig. 6. This figure diagrammatically illustrates the relative positions of the bleeder valve control members 61—68 with respect to the bleeder valves 51—58 at the respective mold positions, which have been designated with the numerals 1 to 8, respectively.

It is assumed that those bleeder valves under the designation 1 are those individual to the pressing unit illustrated in section in Fig. 2 wherein a charge of glass is illustrated as having just been delivered to the mold. In Fig. 6, it will be observed that member 66 for actuating the shear control bleeder valve 58 has just passed shear control bleeder valve 58 at position 1 which accounts for the presence of a charge 132 in the mold, member 66 is about to pass over bleeder valve 56 to effect return of the guide at position 1, member 61 is about to actuate that bleeder valve which effects control over the lowering of the pressing plunger at position 2, member 62 is about to actuate that bleeder valve at position 4 which effects control over the raising of the pressing plunger, member 63 is about to actuate that bleeder valve which effects control over the opening of the mold at position 5, member 67 is about to actuate that bleeder valve which supplies air for discharging the finished article at position 6, member 64 is about to actuate that bleeder valve which effects control over the closing of the mold at position 7, and member 65 is about to actuate that pilot valve which effects control of the alignment of the charge guide funnel at position 8 in readiness for the receipt of a charge at that position. It will be observed that the spacing of members 61 and 62 is such that a plunger remains down while two other steps in the cycle are occurring. This is done to allow ample time for the formed article to set up.

While only one specific form of the invention has been illustrated, it will be apparent to those skilled in the art that the features of novelty herein disclosed and claimed may well be employed in many different forms of structures without departing from the spirit and scope of the invention.

I claim:

1. In a glass working apparatus, a plurality of symmetrically arranged fabricating units, an element for successively guiding charges of glass toward said units; a cullet chute, and guide members for said units having alternative positions in one of which they direct charges of glass issuing from said element into their associated units and in the other of which they divert such charges to said cullet chute, and means for shifting said guide members back and forth between such positions.

2. In a glass working apparatus, a stationary mold, a pressing plunger aligned over said mold, a movable member for guiding mold charges into said mold, means for periodically moving said member into and out of the path of movement of said plunger into and out of operative relation to said mold, and means for feeding mold charges to said guiding member during pauses occurring between its respective movements.

3. In a glass working press, an annular row of fixed mold assemblies, a movable glass distributing member having its glass receiving end arranged beneath the bottom outlet of a forehearth from which charges of glass are supplied, a plunger assembly arranged in operative alignment with each mold assembly, a mold charge guide arranged alongside each plunger assembly, means for successively positioning said guide assemblies in feeding relation to their molds for a period necessary to charge them, and means for uninterruptedly moving the discharge end of said glass distributing member into successive register with the receiving ends of the positioned guide members.

4. The combination, with a plurality of stationary glass shaping units, of individual members for guiding charges of glass into association with said units, means for moving said members into glass delivery relation with their respective units, continuously moving glass charge delivering means successively associated with said members following their movement into delivery relation with their units, and means for thereafter returning such members to their initial positions.

5. In a glass working press, a stationary support having an annular row of pressing units mounted thereon, each including a mold, a mold charge guide, and a pressing plunger; means for successively moving the mold guides thereof into feeding relation therewith and for then, in like sequence, feeding charges of glass thereto through such guide members, means for returning said mold charge guides, in like sequence, to their initial positions, and means for effecting the successive movements of the respective plungers into and out of pressing relation with their molds following their receipt of charges of glass.

LEVI F. GOODRICH.